July 31, 1923.

E. B. MABEE 1,463,624

ILLUMINATING DEVICE FOR THE EXAMINATION OF NEGATIVES

Filed Feb. 25, 1922

Inventor
Elliott B. Mabee
By his Attorneys
Kenyon & Kenyon

Patented July 31, 1923.

1,463,624

UNITED STATES PATENT OFFICE.

ELLIOTT B. MABEE, OF BROOKLYN, NEW YORK.

ILLUMINATING DEVICE FOR THE EXAMINATION OF NEGATIVES.

Application filed February 25, 1922. Serial No. 539,096.

*To all whom it may concern:*

Be it known that I, ELLIOTT B. MABEE, a citizen of the United States, and a resident of Brooklyn, in the county of Kings and State of New York, have invented a new and useful Improved Illuminating Device for the Examination of Negatives, of which the following is a specification.

My invention relates to illuminating devices for the examination of negatives, and its construction renders it particularly suitable for the work of examining and diagnosing X-ray negatives where accurate interpretation is indispensable to correct diagnosis as hereinafter explained.

It has for its main object to make possible an exact interpretation of negatives by insuring the needed surrounding conditions and perfect illumination necessary for such purpose, and an illumination which can be varied as occasion requires.

In the study of X-ray negatives many conditions may exist which are not visible under ordinary examination. The interpretation of these conditions is indispensable to a true and complete diagnosis, and the source of light by means of which the examination is made, its immediate surroundings, and the way in which the light is applied amid such surroundings, become of paramount importance. My improved device is designed to meet this situation. By means of its magnifying element it reveals the most minute details of negatives, and the white artificial light, concentrated and evenly diffused by the cooperating rotatable ball-shaped members, brings contrasts into relief, while the exclusion of all outside light renders clear definition possible. At the same time its regulating feature permits a range of light adaptable to various densities and shadings which vary with different negatives.

Figure 1:
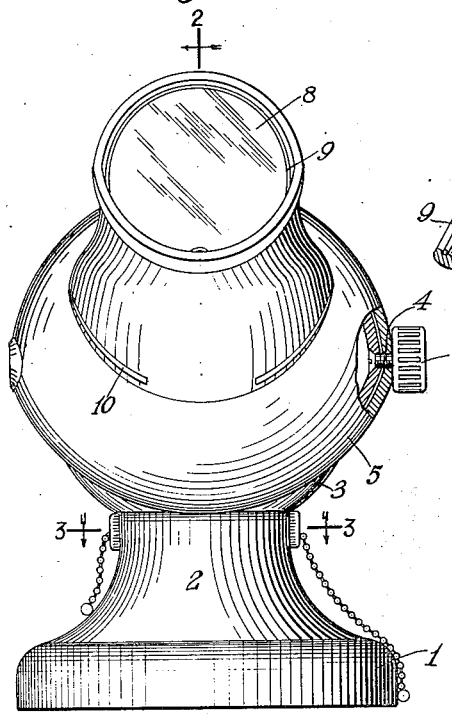
Figure 2:
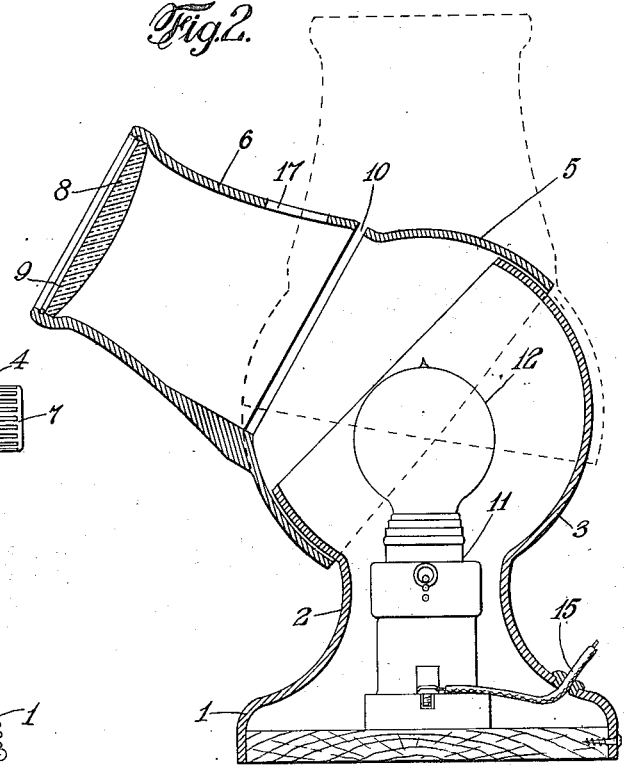
Figure 4:
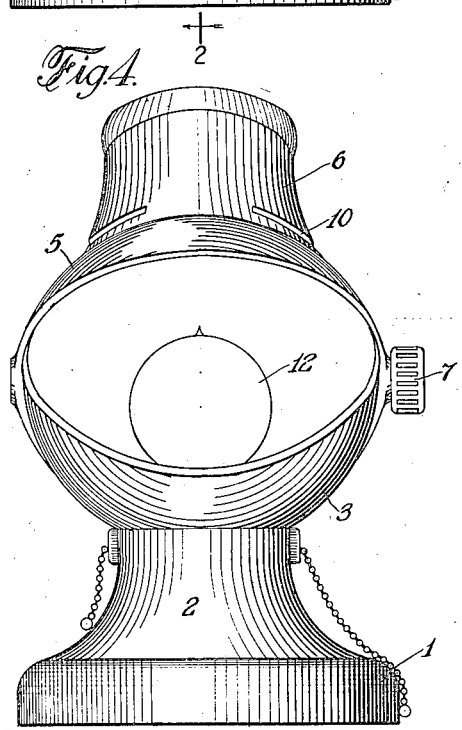
Figure 3:
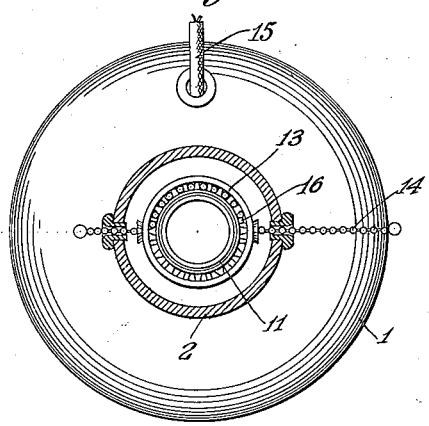

Other advantages and objects will appear from the following description, taken in connection with the accompanying drawings forming part hereof, in which Figure 1 is a front elevation of one embodiment of my device, Fig. 2 a longitudinal section on the line 2—2 of Fig. 1, the position of the upper part of the device when elevated to vertical position, being shown in dotted lines; Fig. 3 is a horizontal section on the line 3—3 of Fig. 1 and Fig. 4 is a front elevation of the embodiment of my invention illustrated in Fig. 1, showing its rotatable part positioned at the limit of its upper and backward movement. Similar reference figures refer to the same parts.

As will be evident from the drawings, the frame of my device consists of two parts: a stationary base member, whose upper end terminates in a hollow substantially hemispherical part; and a second movable member, pivoted to the former, its inner end of similar shape to, and cooperating with, the hemispherical part of the base member, and its outer end being contracted into the shape of a tube. The two are so pivoted together that the upper part rotates upon the lower, and may be held in the position it assumes in any part of its rotation by means of a stop screw.

These parts are made of opaque material, preferably aluminum or some other metal. The lower part is made up of the hollow base 1, which, narrowing into the neck portion 2, widens again into the hollow and substantially hemispherical part 3, the whole being in one piece. The upper member, which is pivoted to the base member at 4, comprises a similar substantially hemispherical hollow part 5, and is contracted at its other end into the circular tube-shaped part 6. The part 5 is larger in circumference than the part 3 to allow it to rotate over the latter. The movability of the upper upon the lower member is indicated in dotted lines in Fig. 2. By operating the stop screw 7 in the usual way, the upper member may be elevated or lowered, or fastened, and held in any desired position in its path of movement.

In the open end of the tubular part 6 a magnifying lens 8 is removably placed, and is held in position by means of the spring holder 9. This magnifying lens is of such focus and convexity that it allows negatives to be examined at any distance. At the opposite end of the part 6 a slot 10 is provided for the reception of negatives. This slot is made to accommodate any type and size of negative or negative in holder.

In the base of my improved device is constructed a lamp socket 11, to receive an electric lamp such as 12, combined in the usual way with a rheostat 13 which is rotated by means of a beaded chain 14 to give any degree of light required when the device is connected to a source of supply at 15. The chain is secured to the rheostat at 16.

My device is so constructed that when the part 5 is rotated to the limit of its backward movement, as illustrated in Fig. 4, the lamp and rheostat can be easily removed or replaced through the opening left between the members 3 and 5. This is a very valuable feature of my device. It makes it possible to remove and renew the parts most likely to need replacement, without disturbing or disarranging any other part of the construction and makes the device a substantially unitary structure.

17 is an opening which, as illustrated in Fig. 2, is located in front of the slot 10. The object of this opening or explanation window is to enable the operator when exhibiting a negative to a patient, to insert a pointer in designating and explaining his diagnosis as the patient views the magnified negative through the lens 8.

In order to eliminate any confusing or disturbing reflections I prefer to give to the interior of the tubular part 6 of my device a dull, black finish. The interior of the two hemispherical portions is made light-reflecting, as by a coating of aluminum paint. The color of its exterior may be made to harmonize with the fittings of any particular office.

It will be evident from the foregoing that I have devised an illuminating device for the examination of X-ray and other negatives, which possesses a number of novel features. In work of this kind, as is well understood, artificial light is better than daylight. My structure eliminates all outside light, and because of the circular contour of its parts concentrates the artificial light. Furthermore it has means for increasing or decreasing the light according as the different densities of the film or negative under examination call for greater or less illumination, and because of its rotary or ball movement of one part upon the other, it permits the viewing of the negative being studied in either a sitting or standing position. The simplicity of its construction is such that it need never be taken apart, as by simply rotating the upper part back over the lower the lamp and rheostat become accessible through the opening thus formed between the forward edges of the two hemispherical parts, and the lamp and rheostat can be removed and replaced with ease; the inner surface of the magnifying lens is also easily reached; and the smooth surface of the device enables it to be kept in a cleanly state.

It is understood that changes within the scope of the appended claims may be made in the device herein disclosed without departing from the spirit of the invention.

What I claim as new and desire to secure by Letters Patent, is:

1. The device herein described consisting of a hollow base member terminating at its upper end in a substantially hemispherical part, and a second hollow member pivoted to the base member, the base member having an opening which adjoins a similar opening in said second member, said second member having a spherical part which is adapted to rotate over and upon the said substantially hemispherical part of the base member.

2. The device herein described consisting of a hollow base member containing an artificial illuminant, a hollow member pivoted to said base member, the said base member having an open part which adjoins a similar open part of said second member, which latter contains a slot for the reception of a film or film in holder, and has a spherical part adapted to rotate upon and over a similar spherical part of the base member.

3. In a device of the character described, the combination of two hollow members with adjoining open portions, one of said members containing illuminating means, and means for connecting the same to a source of supply, and the other member provided with means for holding a magnifying lens and also for mounting a negative or negative in holder therein, both members having spherical portions upon which one rotates over the other.

4. The device herein described consisting of a hollow base member containing an artificial illuminant, means for increasing or decreasing the intensity of the illuminant, a hollow member pivoted to said base member, the said base member having an open part which adjoins a similar open part of said second named member, a magnifying lens mounted in said second member which member also has a slot back of said magnifying lens for the reception of a film or film in holder, and an opening in its upper circumference in front of the film, the upper member being adapted to rotate over the lower, and means for fastening the same at any point in its path of movement.

5. The device herein described which consists of two members having spherical portions adapted to rotate one upon the other, one of said members containing an artificial illuminant, the other having mounted thereon a magnifying lens and having a holding means for the retention of the film therein, the two members coacting with each other to shut out outside light, and adapted, when rotated to open position, to permit the removal or replacement of said illuminant.

6. The device herein described which consists of two substantially hemispherical members adapted to rotate one upon the other, one of said parts containing an artificial illuminant, the other having mounted thereon a magnifying lens and a holder for the retention of a film or film in holder therein, the two members coacting with each other to shut out outside light and to permit the examination of said film at different elevations, of the member carrying the film.

7. The device herein described which consists of two substantially hemispherical members adapted to rotate one upon the other, one of said parts containing an artificial illuminant, the other having mounted thereon a magnifying lens and a holder for the retention of a film or film in holder therein, the two members coacting with each other to shut out outside light and to permit the examination of said film at different elevations, said members so constructed that when the member containing the magnifying lens is rotated to the limit of its upward and backward movement, said illuminant may be removed or replaced through the opening between the two members.

8. The device herein described consisting of a stationary base member whose upper end terminates in a hollow substantially hemispherical part, a movable member pivoted to said base member and adapted to rotate thereon, one end of said movable member having a similarly shaped hemispherical part, its other end being contracted to form a tube in the end of which a magnifying lens is removably placed, illuminating means in said base, and means for regulating the intensity of said illuminating means, said stationary and movable members so constructed that when the movable member is rotated to the limit of its upward and backward position, the said illuminating and regulating means may be removed or replaced through the opening between the two members.

9. The device herein described consisting of a stationary base member whose upper end terminates in a hollow substantially hemispherical part, a movable member pivoted to said base member and adapted to rotate thereon, one end of said movable member having a similarly shaped hemispherical part, its other end being contracted to form a tube and having a slot therein for receiving a negative or negative in holder, and a magnifying lens in the end of said tube, illuminating means in said base member, and means for regulating the intensity of said illuminating means, said stationary and movable members so constructed that when the movable member is rotated backward so as to leave an opening between it and the stationary member, the said illuminating and regulating means may be removed or replaced therethrough.

10. The device herein described consisting of a stationary base member whose upper end terminates in a hollow substantially hemispherical part, a movable member pivoted to said base member and adapted to rotate thereon, one end of said movable member having a similarly shaped hemispherical part, its other end being contracted to form a tube and having a slot therein for holding a negative or negative in holder, and an opening in the upper circumference thereof in front of said slot, and a magnifying lens removably placed in the end of said tube, illuminating means in said base member, and means for regulating the intensity of said illuminating means.

In testimony whereof, I have signed my name to this specification.

ELLIOTT B. MABEE.